United States Patent
Zhu et al.

(10) Patent No.: US 12,231,241 B2
(45) Date of Patent: Feb. 18, 2025

(54) HARQ FEEDBACK ENHANCEMENT METHOD AND APPARATUS, COMMUNICATION DEVICE AND STORAGE MEDIUM

(71) Applicants: Beijing Xiaomi Mobile Software Co., Ltd., Beijing (CN); Beijing University of Posts and Telecommunications, Beijing (CN)

(72) Inventors: Yajun Zhu, Beijing (CN); Wei Hong, Beijing (CN); Junli Li, Beijing (CN); Yong Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 345 days.

(21) Appl. No.: 17/632,967

(22) PCT Filed: Aug. 7, 2019

(86) PCT No.: PCT/CN2019/099611
§ 371 (c)(1),
(2) Date: Feb. 4, 2022

(87) PCT Pub. No.: WO2021/022517
PCT Pub. Date: Feb. 11, 2021

(65) Prior Publication Data
US 2022/0294568 A1  Sep. 15, 2022

(51) Int. Cl.
*H04L 1/18* (2023.01)
*H04L 1/1812* (2023.01)
(Continued)

(52) U.S. Cl.
CPC .......... *H04L 1/1812* (2013.01); *H04L 1/1832* (2013.01); *H04L 1/1861* (2013.01); *H04W 72/23* (2023.01)

(58) Field of Classification Search
CPC ... H04L 1/1812; H04L 1/1832; H04L 1/1854; H04L 1/1861; H04L 1/1896;
(Continued)

(56) References Cited

U.S. PATENT DOCUMENTS 10,966,236 B2 * 3/2021 Xiong .................. H04L 5/0094
2013/0114575 A1  5/2013 Fu et al.
(Continued)

FOREIGN PATENT DOCUMENTS

CN   102111254 A   6/2011
CN   103873212 A   6/2014
(Continued)

OTHER PUBLICATIONS

3GPP TSG RAN WG1 Meeting #96 R1-1901527 Athens, Greece, (Feb. 25-Mar. 1, 2019).
(Continued)

*Primary Examiner* — Wutchung Chu
(74) *Attorney, Agent, or Firm* — Volpe Koenig

(57) ABSTRACT

Disclosed is a hybrid automatic repeat request (HARQ) feedback enhancement method. The method comprises: sending downlink control information comprising first indication information to a terminal, the first indication information being used for indicating the number of downlink transport blocks received by the terminal on a sub-frame after the current sub-frame and a sub-carrier after the current sub-carrier within the current HARQ feedback window.

11 Claims, 9 Drawing Sheets

(51) Int. Cl.
*H04L 1/1829* (2023.01)
*H04W 72/23* (2023.01)

(58) Field of Classification Search
CPC ... H04L 5/0055; H04L 5/0057; H04L 5/0094; H04W 72/23
See application file for complete search history.

(56) References Cited

U.S. PATENT DOCUMENTS

| | | |
|---|---|---|
| 2016/0226630 A1 | 8/2016 | Zhang et al. |
| 2018/0278373 A1 | 9/2018 | Wang et al. |
| 2019/0215104 A1 | 7/2019 | Salem et al. |
| 2020/0022175 A1* | 1/2020 | Xiong ............. H04L 5/001 |
| 2020/0177352 A1* | 6/2020 | Peng ............... H04L 1/1861 |
| 2020/0305131 A1* | 9/2020 | Chatterjee ........ H04L 1/0045 |
| 2022/0131650 A1* | 4/2022 | Chen ............... H04L 1/1896 |
| 2022/0278807 A1* | 9/2022 | Zhang ............. H04L 1/1864 |
| 2023/0015488 A1* | 1/2023 | Xiong ............... H04L 5/14 |

FOREIGN PATENT DOCUMENTS

| | | |
|---|---|---|
| CN | 105846977 A | 8/2016 |
| CN | 106301702 A | 1/2017 |
| CN | 107359969 A | 11/2017 |
| CN | 107437980 A | 12/2017 |
| CN | 107925445 A | 4/2018 |
| CN | 108206732 A | 6/2018 |
| CN | 109842476 A | 6/2019 |
| WO | 2014/196616 A1 | 12/2014 |
| WO | 2019/066630 A1 | 4/2019 |

OTHER PUBLICATIONS

3GPP TSG-RAN WG1 Meeting #96 Draft CR R1-1902559 Athens, Greece, (Feb. 25-Mar. 1, 2019).
R1-1905649 Feature lead summary for 7.2.2.2.3 NRU HARQ RAN96bisv4, «3GPP TSG_RAN\WG1_RL1» (Apr. 8-12, 2019).
R1-1907263 7.2.2.2.3 Enhancements to Scheduling and HARQ Operation for NR-U, «3GPP TSG_RAN\WG1_RL1» (May 13-May 17, 2019).
Mediatek Inc.: "R1-1812358 "Enhancements on HARQ for NR-U operation, «3GPP TSG_RAN\WG1_RL1» (Nov. 12-16, 2018).
R1-1811254 7.2.2.4.3 Enhancements to Scheduling and HARQ Operation for NR-U, «3GPP TSG_RAN\WG1_RL1» (Oct. 6-Oct. 12, 2018).
Huawei 等: "R1-1808063 "HARQ enhancement in NR unlicensed, «3GPP TSG_RAN\WG1_RL1» (Aug. 20-Aug. 24, 2018).
R1-1813222 HARQ Enhancements for NR-U, «3GPP TSG_RAN\WG1_RL1»(Nov. 12-16, 2018).
R1-1802652 Data Scheduling and HARQ for NR Operation in Unlicensed Bands, «3GPP TSG_RAN\WG1_RL1» (Feb. 26-Mar. 2, 2018).
Huawei et al. Remaining issues for dynamic HARQ-ACK codebook determination 3GPP TSG RAN WG1 Meeting #83 R1-156452,Nov. 22, 2015(Nov. 22, 2015), chapter 2.
Huawei et al. "Detailed solution for dynamic HARO-ACK Codebook determination"3GPP TSG RAN WG1 Meeting #82bis R1-155092. Oct. 9, 2015(Oct. 9, 2015). sections 2-3.

* cited by examiner

HARQ FEEDBACK ENHANCEMENT METHOD AND APPARATUS, COMMUNICATION DEVICE AND STORAGE MEDIUM

CROSS-REFERENCE TO RELATED APPLICATION

The present application is a U.S. National Phase of International Patent Application Serial No. PCT/CN2019/099611, filed on Aug. 7, 2019, the entire content of which is hereby incorporated by reference in its entirety for all purposes.

BACKGROUND

Increased use of mobile devices and rapid development of mobile Internet has brought an explosive increase in reliance on mobile data. In response to demand, requirements for increases in flow density, network capacity, user rates, and decreases in time delays and the like are proposed. In order to meet the challenges, a completely new air interface design reliant on 5th generation (5G) mobile communication new radios (NR) is proposed, including new implementation scenarios and expanded use of frequency bands. On the other hand, shortage of spectrum resources is an increasingly grim reality for mobile communication networks. Licensed frequency bands, particularly low frequency bands are resources with relatively high value. These resources are limited in bandwidth and are being rapidly consumed by increasing numbers of terminal groups. In order to meet the challenge of shortage of spectra and to increase the capacity of a system, a research program for new radio based shared spectrum (New Radio Based Unlicensed Access, NR-U) is proposed, and a research project has been started.

SUMMARY

The examples of the disclosure provide a hybrid automatic repeat request (HARQ) feedback enhancement method and apparatus, a communication device and a storage medium. According to a first aspect of the examples of the disclosure, a HARQ feedback enhancement method is described, the method including: sending downlink control information including a first indication information to a terminal. Specifically, the first indication information is used for indicating a quantity of downlink transmission blocks received by the terminal on a subframe after a current subframe and a subcarrier after a current subcarrier, in a current hybrid automatic repeat request (HARQ) feedback window.

According to a second aspect of the examples of the disclosure, a HARQ feedback enhancement method is further provided, including: receiving downlink control information including a first indication information; and determining the quantity of the received downlink transmission blocks on the subframe after the current subframe and the subcarrier after the current subcarrier, in the current hybrid automatic repeat request (HARQ) feedback window according to the first indication information.

In an example, the downlink control information further includes a second indication information. The method further includes: sending HARQ feedback of the first transmission blocks and/or HARQ feedback of the second transmission blocks according to the second indication information. Specifically, the first transmission blocks are the transmission block decoded by the currently used first codebook, and the second transmission blocks are the transmission blocks decoded by the second codebook used before the first codebook.

According to a third aspect of the examples of the disclosure, further provided is a communication device, including: an antenna; a memory; and a processor connected with the antenna and the memory, and used for controlling the antenna to receive and send a wireless signal by executing an executable program comprising processor-executable instructions stored in the memory, which when executed by the processor configure the processor to execute the steps of the HARQ feedback enhancement method provided by any technical solution mentioned above.

According to a fourth aspect of the examples of the disclosure, a non-transitory computer-readable storage medium is provided. The non-transitory computer-readable storage medium stores the executable program including the processor-executable instructions, in which when the executable program is executed by the processor, the steps of the HARQ feedback enhancement method provided by any technical solution mentioned above are implemented.

DETAILED DESCRIPTION

Figure 1:
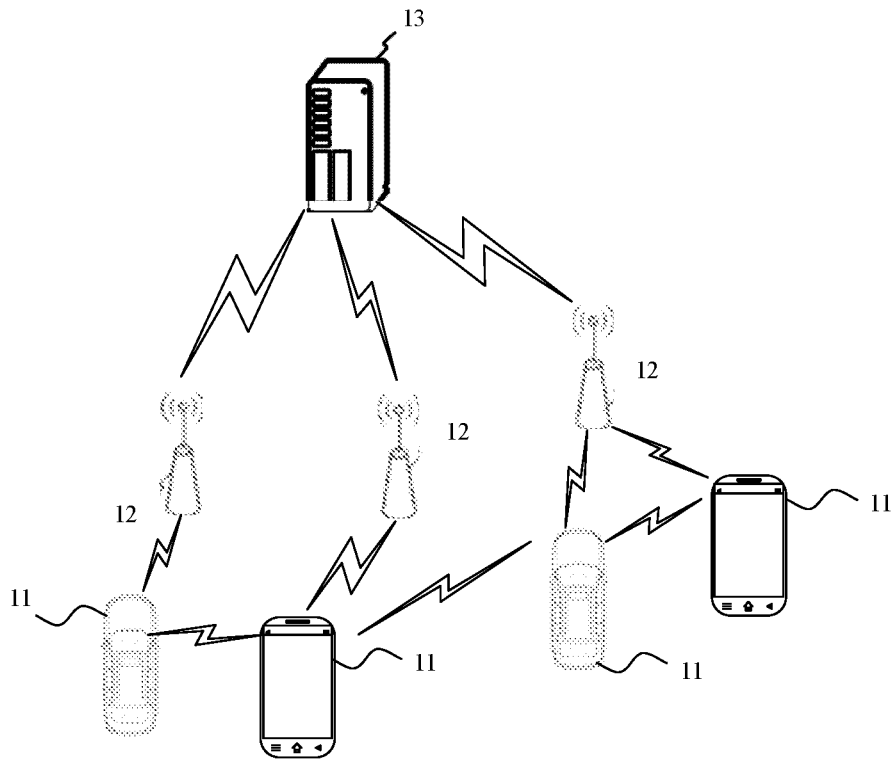
FIG. 1 is a structural schematic diagram of a wireless communication system provided according to an example of the disclosure.

Examples of the disclosure will be described in detail below with reference to the accompanying drawings in which the same numbers in different drawings represent similar elements unless otherwise represented. The implementations set forth in the following examples do not represent all possible implementations within the scope of the disclosure. Rather, they are examples of apparatuses and methods which are set forth in the accompanying claims and are exemplary of aspects of the disclosure.

The terms used in the description of the examples of the disclosure are for the purpose of describing particular examples only, and are not intended to limit the scope of the disclosure. The singular forms "a" and "the" used in the examples of the disclosure and the accompanying claims are intended to include the plural forms as well, unless the context clearly indicates otherwise. It should be further understood that the term "and/or" used herein refers to and encompasses any and all possible combinations of one or more of the associated listed items.

It should be understood that although the terms first, second, third, etc. may be used in the examples of the disclosure to describe various information, the information should not be limited by these terms. These terms are used only to distinguish information of the same type from each other. For example, first information could be termed second information, and, similarly, second information could be termed first information, without departing from the scope of the examples of the disclosure. Depending on context, if the word "if" used herein may be interpreted as "when . . . " or "during . . . " or "in response to".

The disclosure relates to, but is not limited to, the technical field of wireless communication, in particular to a hybrid automatic repeat request (HARQ) feedback enhancement method and apparatus, a communication device and a storage medium.

Increased use of mobile devices and rapid development of the mobile Internet has brought an explosive increase in demand for mobile data. To meet the demand, higher requirements for network performance in terms of flow density, network capacity, user rate, time delay and the like are proposed. In order to meet the challenges, an air interface design for 5th generation (5G) mobile communication new radios (NR) is emerging, featuring new usage scenarios and expanded usage of frequency bands. On the other hand, shortage of spectrum resources is the increasingly grim reality for mobile communication networks. Licensed frequency bands, particularly low frequency bands, are resources with relatively high value, yet they are limited in bandwidth. These resources are being rapidly consumed by increasing terminal groups. In order to meet the challenge of shortage of spectra and in order to increase the capacity of a system, a research program for new radio based shared spectrum (New Radio Based Unlicensed Access, NR-U) is proposed, and a research project has been started.

NR based shared spectrum (NR-U) access and license assisted access (LAA) are two network technologies using a NR and a long term evolution (LTE) air interface in a shared spectrum. Although shared spectrum are not rich in bandwidth resources, in order to guarantee equity and coexistence between different radio access technologies (RAT) using these frequency bands, a listen before talk (LBT) technology based on clear channel assessment (CCA) is introduced into the LAA. The important goal of guaranteeing equity and coexistence motivate introduction of LBT technology, and in particular its introduction into the NR based shared spectrum approach.

In a NR system, the probability of missing detection of a physical downlink control channel/physical uplink control channel (PDCCH/PUCCH) is very low, and the loss of 4 PDCCH continuously may be tolerated. However, in the NR-U system, due to introduction of an LBT mechanism, uplink (UL) LBT failure may be caused by the hidden node problem attending the LBT mechanism. Here, the probability of missing detection of the PDCCH/PUCCH is increased as more PDCCH are continuously lost, which can result in downlink HARQ feedback failure in sending, and ultimately, failure of HARQ feedback to a user.

Aiming to address the above problems, and in order to provide a plurality of transmission opportunities to a HARQ, a protocol for supporting a base station to trigger HARQ feedback for a physical downlink shared channel (PDSCH) or a last HARQ feedback window in a period of a last channel occupancy time (COT) is developed. However, in the implementation of the technical solutions proposed in the protocol, there is a problem in that content of HARQ feedback between a base station (gNB, next generation Node B) and a user terminal (UE, unit equipment) may be unclear. Referring to FIG. 1, there is shown a schematic view of a structure of a wireless communication system according to an example of the disclosure. As shown in FIG. 1, the wireless communication system is based on a cellular mobile communication technology and may include a plurality of terminals 11 and a plurality of base stations 12.

The terminals 11 may be devices providing voice and/or data connectivity points for users. Each terminal 11 may conduct communication with one or more core networks through a radio access network (RAN) and may be a terminal of the Internet of things, such as a sensor device, a mobile phone (or called "cell" phone) or a computer serving as a terminal in an Internet of things implementation. This may be, for example, a fixed apparatus, a portable apparatus, a pocket apparatus, a handheld apparatus, an internal apparatus for a computer or a vehicle-mounted apparatus, for example, a station (STA), a subscriber unit, a subscriber station, a mobile station, a mobile station, a remote station, an access point, a remote terminal, an access terminal, a user terminal, a user agent, a user device or a user terminal (user equipment, UE). Further, each terminal 11 may comprise a device for an unmanned aerial vehicle (UAV). Further, each terminal 11 may comprise a vehicle-mounted device, for example, an on-board computer with a wireless communication function or a wireless communication device externally connected with the on-board computer. Further, each terminal 11 may comprise a roadside device, for example, a street lamp, a signal lamp or other roadside device with wireless communication capability.

Each base station 12 may be a network side device in a wireless communication system, in which case the wireless communication system may be a 4th generation mobile communication (4G) system, also called long term evolution (LTE) system. The wireless communication system may comprise a 5G system, also called a new radio (NR) system or a 5G NR system. The wireless communication system may further comprise a next generation system of a 5G system. An access network in the 5G system may be referred to as a new generation-radio access network (NG-RAN) or an MTC system.

Each base station 12 may be an evolved base station (eNB) employed in the 4G system; or each base station 12 may further be a base station (gNB) employing a centralized distribution type architecture in the 5G system. When employing a centralized distribution type architecture, each base station 12 generally includes a central unit (CU) and at least two distributed units (DU). In the central unit, protocol stacks of a packet data convergence protocol (PDCP) layer, a radio link control (RLC) protocol layer and a media access control (MAC) layer are implemented; and in each distributed unit, a physical (PHY) layer protocol stack is implemented. Examples within the scope of the disclosure are not limited with respect to any specific implementation manner of each base station 12.

The base stations 12 and the terminals 11 establish wireless connection through wireless air interfaces respectively. In different embodiment modes, the wireless air interface is based on a 4th generation mobile communication (4G) standard; or the wireless air interface is based on a 5th generation mobile communication (5G) standard, for example, the wireless air interface can be a new radio; or the wireless air interface can further be a wireless air interface based on a mobile communication standard of a next generation of 5G standard.

In some examples, an E2E (End to End) connection may further be established between the terminals 11, for example, in implementations of V2V (vehicle to vehicle) communication, V2I (vehicle to Infrastructure) communication and V2P (vehicle to pedestrian) in vehicle networking communication (vehicle to everything, V2X).

In some examples, each of the above wireless communication systems may further include a network management device 13. For example, a plurality of base stations 12 are connected with the network management device 13. The network management device 13 may be a core network device in the wireless communication system, for example, the network management device 13 may be a mobility management entity (MME) in an evolved packet core (EPC); or the network management device may further be another core network device, for example, a serving gateway (SGW), a public data network gateway (PGW), a policy and charging rules function (PCRF) unit, a home subscriber network side device (home subscriber server, HSS) or the like. Examples within the scope of the disclosure are not limited with respect to implementation manner of the network management device 13.

Figure 2:
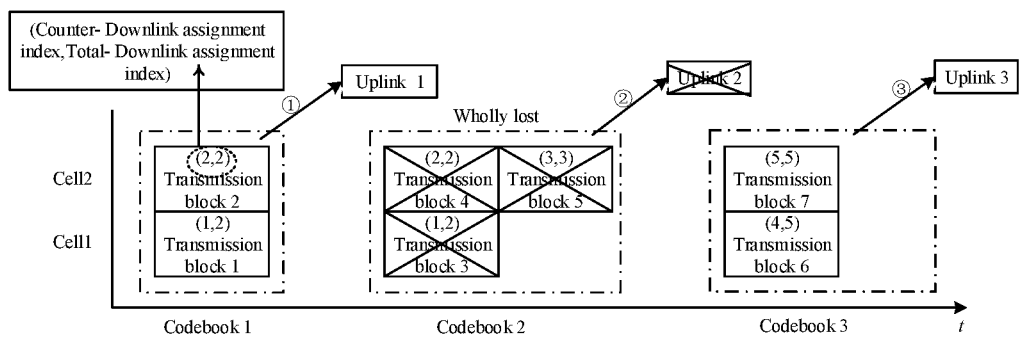
FIG. 2 is a schematic diagram of an HARQ feedback scheme according to an example of the disclosure.

In order to better understand the HARQ feedback enhancement method according to the examples of the disclosure, the related technical solution is described firstly. As shown in FIG. 2, an example of the disclosure provides an HARQ feedback scheme. In this HARQ feedback scheme, a counter-downlink assignment index (C-DAI) sent by each base station is used for indicating a quantity of downlink transmission blocks which can be received by the terminal on a current subframe, a subframe before the current subframe, a current subcarrier and a subcarrier before the current subcarrier in a current HARQ feedback window (here, HARQ feedback windows correspond to one feedback resource, also called one codebook); and a total-downlink assignment index (T-DAI) is used for indicating a quantity of downlink transmission blocks which may be received by the terminal on all subcarriers till the current subframe in the current HARQ feedback window. Here, the C-DAI may be understood to be used for indicating how much downlink data may be received by the terminal on the subframes till the current subframe and the subcarriers till the current subcarrier in the current HARQ feedback window.

Regarding HARQ feedback triggered by the base stations, in an example embodiment, in order to indicate unconfirmed downlink transmission blocks, DAI bits are expanded, and DAI is allowed to conduct continuous counting between different HARQ feedback windows. Referring to the example shown in FIG. 2, as HARQ feedback fails due to loss of all the downlink transmission blocks (blocks 3, 4 and 5) corresponding to a codebook 2 (corresponding to reference numeral ② in the drawing), the base station employs a continuous DAI mechanism and triggers the terminal to feed back the data receiving condition of the codebook 2 together with a codebook 3. The terminal knows that NNN (in which, N is an abbreviation of a negative acknowledgment indicator NACK and used for characterizing negative acknowledgment of states of the received corresponding transmission blocks; and A is an abbreviation of an acknowledgment indicator ACK and used for characterizing acknowledgment of the states of the received corresponding transmission blocks) still requires to be fed back before the downlink transmission block 6 according to the indication that C-DAI=4. When receiving the codebook 3 sent by the base station, the NNN and AA of newly received data are fed back together in a feedback resource indicated by the codebook 3, and a HARQ feedback content is NNNAA.

Figure 3:
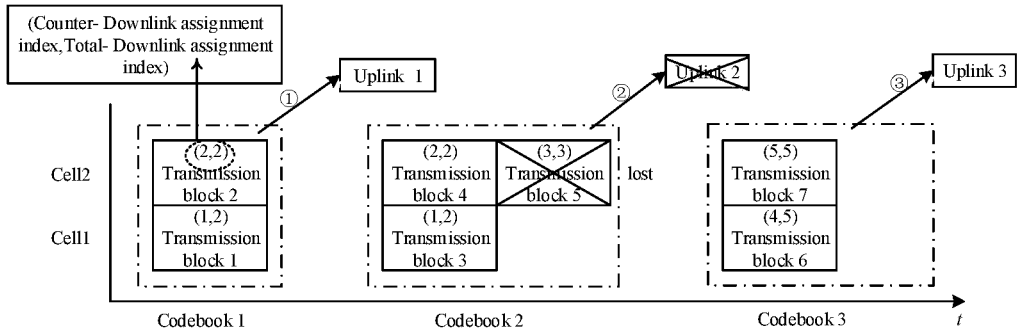
FIG. 3 is a schematic diagram of an HARQ feedback scheme according to another example of the disclosure.

However, as the base station triggering HARQ feedback mechanism is introduced, and continuous DAI counting is allowed to be used for the accumulated downlink transmission blocks, there may be a problem of an unclear HARQ feedback codebook between the base station gNB and the terminal UE. As shown in FIG. 3, as a part of the downlink transmission blocks of the codebook 2 are lost, and HARQ feedback of the downlink transmission blocks fails (corresponding to reference numeral ② in the drawing), the base station employs the continuous DAI mechanism and triggers a user to feed back the data receiving condition of the codebook 2 together with the codebook 3. The terminal may mistakenly believe that first 3 sent transmission blocks are lost in the codebook 2 and might feed back NNNAA (corresponding to reference numeral ③ in the drawing) according to indications that C-DAI=4 when receiving the codebook 3 sent by the base station. However, the HARQ feedback content desired by the base station would be AANAA, and thus the problem of the unclear HARQ feedback codebook between the base station and the terminal occurs.

Figure 4:
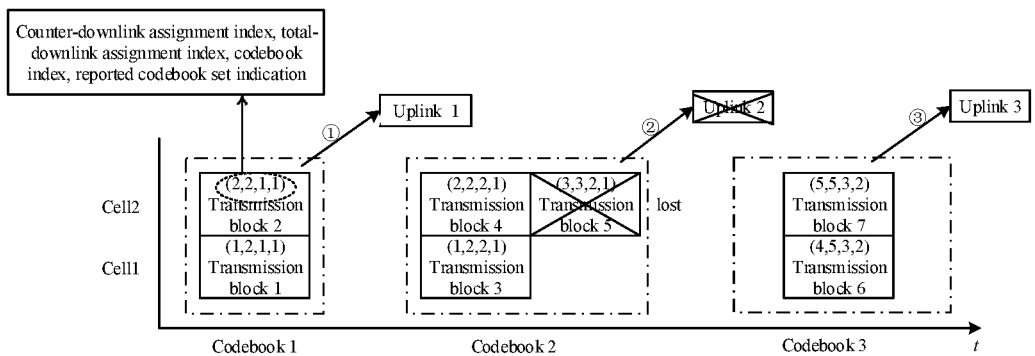
FIG. 4 is a schematic diagram of an HARQ feedback scheme according to another example of the disclosure.

As shown in FIG. 4, another example of the disclosure provides a HARQ feedback scheme. In this HARQ feedback scheme, two indications, including a codebook index (CI) and a reported codebook set indication, are newly added in the NR-U DCI. The CI is used for indicating a group of transmission blocks corresponding to one feedback resource, and occupies 2 bits. The reported codebook set indication is used for indicating the number of a transmission block set required to be fed back, and occupies 2 bits, and when the value is 1, it indicates that only a HARQ in the current codebook is fed back; and when the value is larger than 1, it indicates that HARQ in the current codebook and a front codebook are fed back together.

As shown in FIG. 4, as a part of the downlink transmission blocks of the codebook 2 are lost, and HARQ feedback of the downlink transmission blocks fails (corresponding to reference numeral ② in the drawing), the base station sets the reported codebook set indication of the codebook 3 as 2, and triggers the terminal to feed back the data receiving condition of the codebook 2 together with the codebook 3. When receiving the codebook 3 sent by the base station, the terminal knows that HARQ feedback of the codebook 2 fails according to indications that C-DAI=4 and reported codebook set indication=2 and transmits HARQ feedback, corresponding to the codebook 2 and the codebook 3, in the feedback resource indicated by the codebook 3 together, in which the HARQ feedback content is AANAA.

Figure 5A:
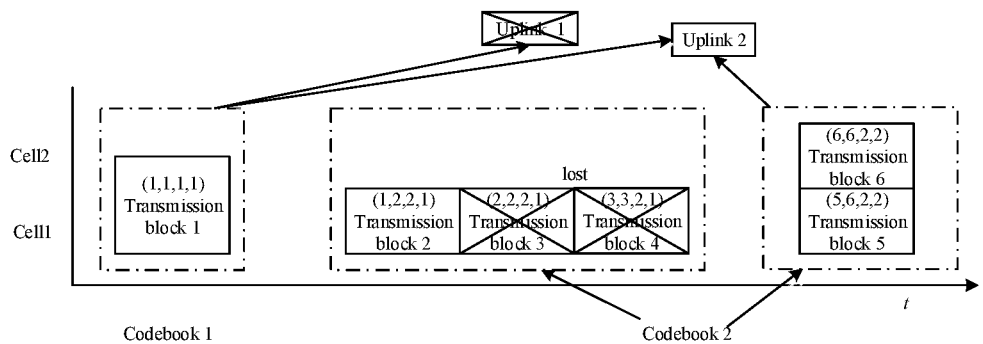
FIG. 5a is a schematic diagram of an HARQ feedback scheme according to yet another example of the disclosure.
Figure 5B:
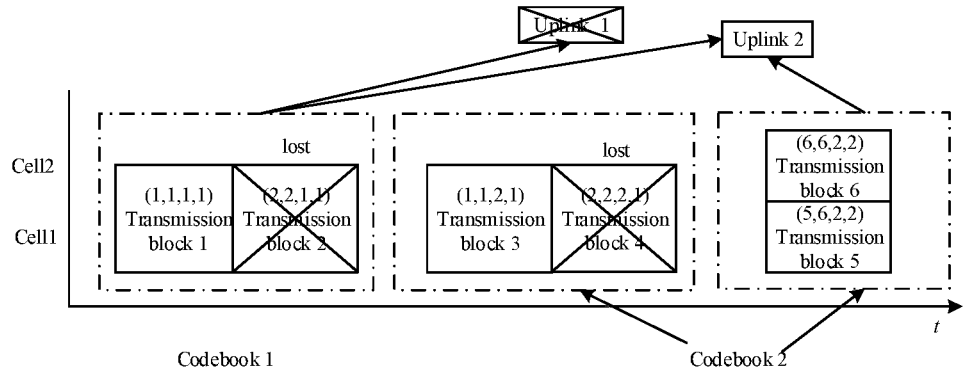
FIG. 5b is a schematic diagram of an HARQ feedback scheme according to yet another example of the disclosure.
Figure 5C:
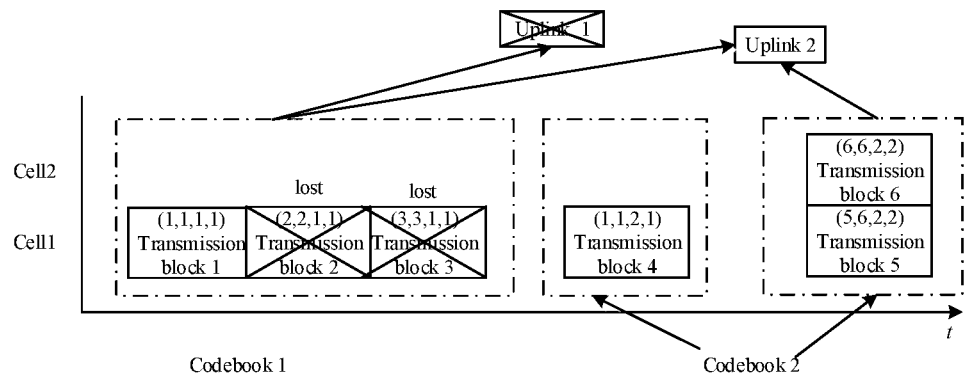
FIG. 5c is a schematic diagram of an HARQ feedback scheme according to yet another example of the disclosure.

Although the problem that unclear HARQ codebooks in a HARQ feedback retransmission scheme are triggered as the base station fails to detect uplink 2 (UL 2) may be reduced by employing the above solution, if retransmission of previous HARQ codebooks is triggered in the middle of the current HARQ codebook, there may be a problem that the terminal feeds back an HARQ wrongly. As shown in FIG. 5a, FIG. 5b and FIG. 5c, as uplink 1 (UL 1) feedback fails, the base station sets the reported codebook set indication of the codebook 2 as 2 and triggers the terminal to feed back the data receiving condition of a codebook 1 together with the codebook 2. However, by employing that solution, the same retransmission indication may be triggered in the three schemes. After the user finishes receiving the codebook 2 sent by the base station, the number of HARQ bits which should be fed back in each codebook and a corresponding content cannot be correctly judged based only on indications that C-DAI=5 and Reported Codebook set indication=2. For example, the base station sends the downlink transmission blocks in the scheme in FIG. 5a; however, as the terminal cannot correctly judge the number of the transmission blocks corresponding to each HARQ codebook and a feedback content, the feedback content may be ANANAA (FIG. 5b) or ANNAAA (FIG. 5c); whereas the content which actually should be fed back is AANNAA, so that there is a situation that the terminal feeds back the HARQ wrongly, and then there is a problem of the unclear HARQ feedback codebook between the base station and the terminal.

Figure 6:
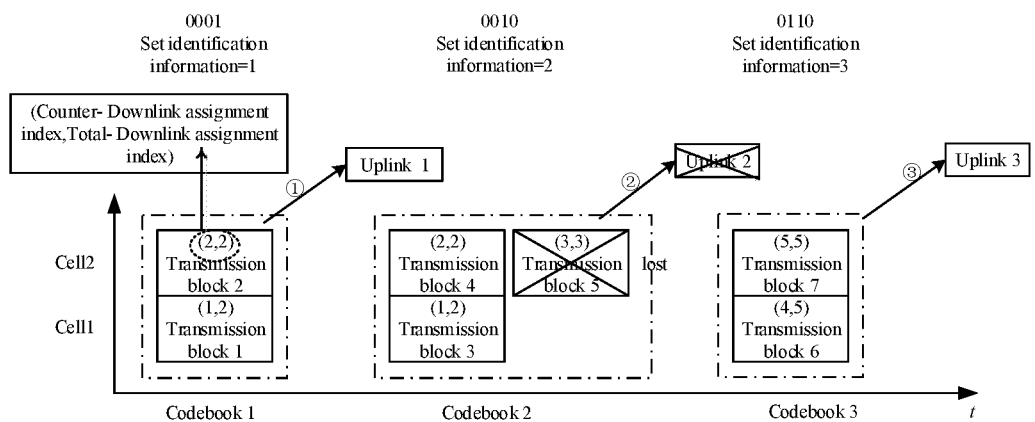
FIG. 6 is a schematic diagram of an HARQ feedback scheme according to another example of the disclosure.

As shown in FIG. 6, yet another example of the disclosure provides a HARQ feedback scheme. In this HARQ feedback scheme, two indications, including set identification (S_ID) information and a set level bitmap, of downlink transmission blocks are newly added in the NR-U DCI. The S_ID is used for indicating a group of downlink transmission blocks corresponding to one feedback resource, occupying 2 bits. The set level bitmap is used for indicating that HARQ feedback of which S_ID requires to be fed back, corresponding to S_ID numbers one to one; and when the bit is 1, it indicates that a HARQ content of the corresponding S_ID is fed back, occupying 4 bits. Referring to FIG. 6, as a part of the downlink transmission blocks of the codebook 2 are lost, and HARQ feedback of the downlink transmission blocks fails (corresponding to reference numeral ② in the drawing), the base station sets the set level bitmap of the codebook 3 as 0110 and triggers the terminal to feed back the data receiving condition of the codebook 2 (0010) together with the codebook 3 (0100). When receiving the codebook 3 sent by the base station, the terminal knows that HARQ feedback of the codebook 2 fails according to indications that C-DAI=4 and set level bitmap=0110 and transmits HARQ feedback, corresponding to the codebook 2 together with the codebook 3, in the feedback resource indicated by the codebook 3, and the HARQ feedback content is AANAA.

Figure 7A:
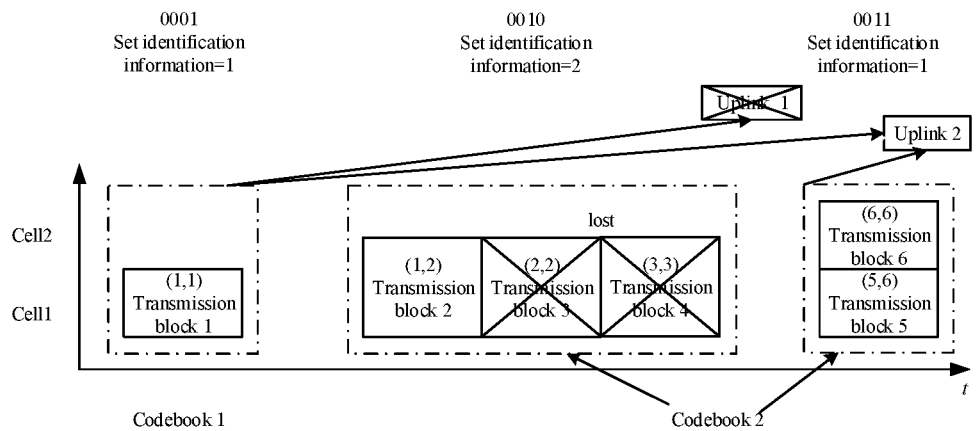
FIG. 7a is a schematic diagram of an HARQ feedback scheme according to yet another example of the disclosure.
Figure 7B:
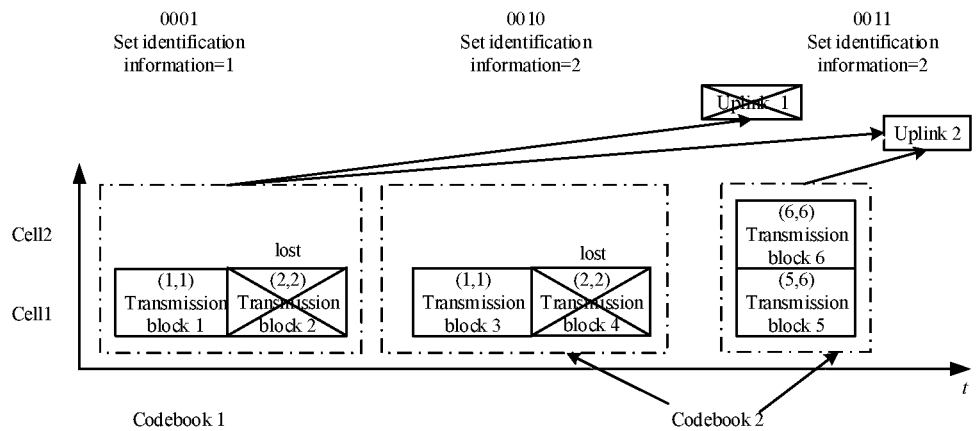
FIG. 7b is a schematic diagram of an HARQ feedback scheme according to yet another example of the disclosure.
Figure 7C:
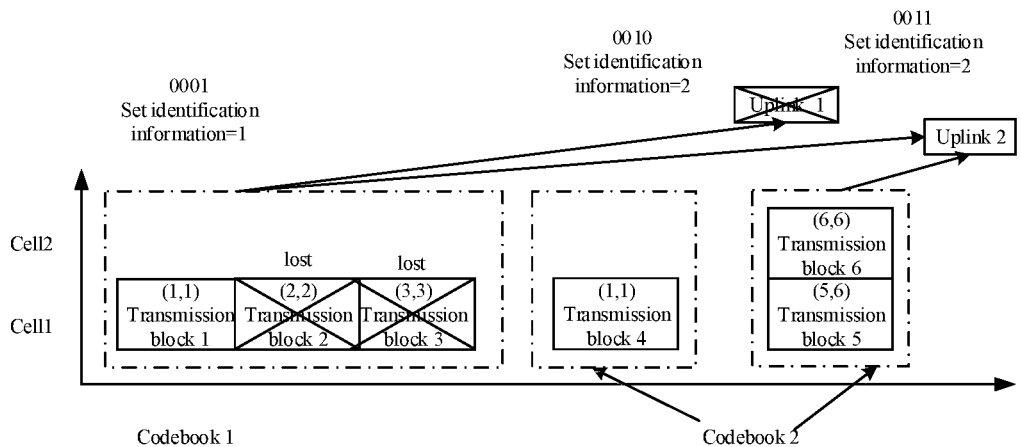
FIG. 7c is a schematic diagram of an HARQ feedback scheme according to yet another example of the disclosure.

Although the problem that the unclear HARQ codebooks in an HARQ feedback retransmission scheme are triggered as the base station fails to detect UL 2 may be reduced by employing the above technical solution, if retransmission of previous HARQ codebooks is triggered in the middle of the current HARQ codebook, there may be a problem that the UE feeds back an HARQ wrongly. As shown in FIG. 7a, FIG. 7b and FIG. 7c, as UL 1 feedback fails, the base station sets the set level bitmap of the codebook 2 as 0011 and triggers the terminal to feed back the data receiving condition of the codebook 1 together with the codebook 2. However, the same retransmission indication may be triggered in the three schemes, and after the terminal receives the codebook 2 sent by the base station, the number of HARQ bits which should be fed back in each codebook and a corresponding content cannot be correctly judged based only on indications that C-DAI=5 and set level bitmap=0011. For example, the base station sends the downlink transmission blocks in the scheme in FIG. 7a; however, as the terminal cannot correctly judge the number of the transmission blocks corresponding to each HARQ codebook and a content, the feedback content may be ANANAA (corresponding FIG. 7b) or ANNAAA (corresponding FIG. 7c); whereas the content which actually should be fed back is AANNAA. This is a situation in which the terminal feeds back the HARQ wrongly, and thus there is a problem of the unclear HARQ feedback codebook between the base station and the terminal.

Figure 8:
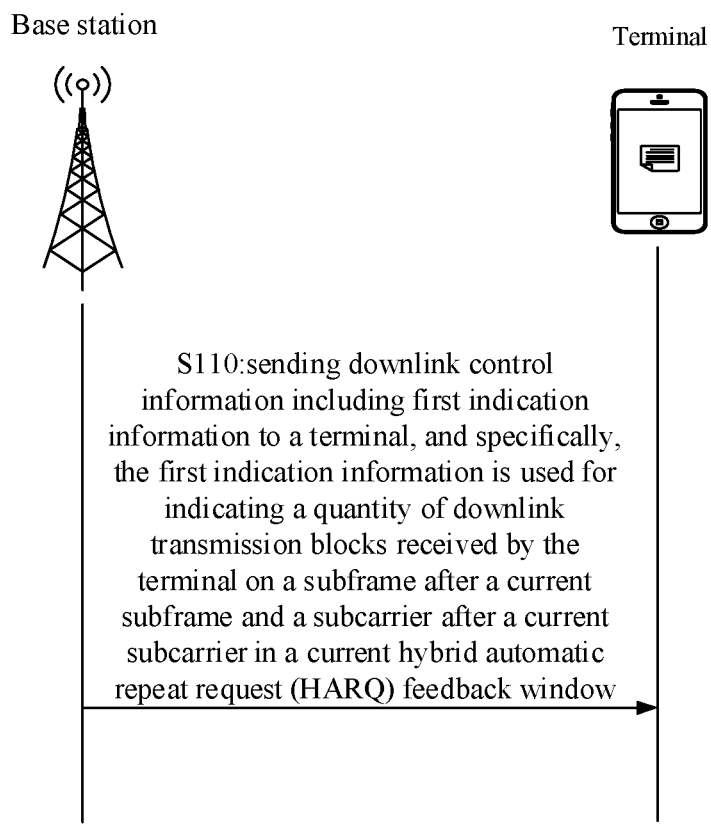
FIG. 8 is a schematic diagram of an HARQ feedback scheme provided according to an example of the disclosure.

As shown in FIG. 8, an example of the disclosure provides an HARQ feedback enhancement method, including: step S110: downlink control information including first indication information is sent to a terminal, and specifically, the first indication information is used for indicating a quantity of downlink transmission blocks to be received by the terminal on a subframe after a current subframe and a subcarrier after a current subcarrier in a current hybrid automatic repeat request (HARQ) feedback window.

Here, the first indication information may be used for indicating how much downlink data remains to be received on subsequent subframes from a current subframe and all subsequent subcarriers from the current subcarrier in the current HARQ feedback window. Here, when data transmission is conducted based on hybrid automatic repeat request (HARQ) feedback of the transmission blocks, a data receiving terminal determines whether it correctly receives data or not. If the data is correctly received, ACK is fed back; and if the data is not correctly received, NACK is fed back. Here, ACK/NACK is transmitted on a physical uplink control channel (PUCCH) or a physical uplink shared channel (PUSCH).

Here, in a time division duplex system, a downlink shared physical channel, sending a plurality of downlink subframes, may feed back ACK or NACK through one uplink subframe. All the downlink subframes, corresponding to one uplink subframe, form a set K, and all the downlink subframes in the set K are collectively called one HARQ feedback window. Here, the terminal may determine whether each downlink transmission block sent by the base station is lost or not according to the quantity of the downlink transmission blocks still required to be received and information of the downlink transmission blocks which have already been received by the terminal, for example, the base station has sent 6 transmission blocks which are a transmission block 1, a transmission block 2, a transmission block 3, a transmission block 4, a transmission block 5 and a transmission block 6 respectively. If field values contained in the corresponding first indication information are 5, 4, 3, 2, 1 and 0 respectively, and the transmission block 2 and the transmission block 5 are lost in the transmission process, the terminal can determine loss of the transmission block 2 and the transmission block 5 according to information of the transmission block 1, the transmission block 3, the transmission block 4 and the transmission block 6 actually received by the terminal in sequence in combination with the field values corresponding to the corresponding first indication information of the transmission block 1, the transmission block 3, the transmission block 4 and the transmission block 6, and can feed receiving and losing results for the downlink transmission blocks back to the base station through an HARQ feedback mode, so that the base station may determine whether to resend the downlink transmission blocks to the terminal or to send new downlink transmission blocks to the terminal.

For example, the base station sends 3 downlink transmission blocks, which are the transmission block 1, the transmission block 2 and the transmission block 3 respectively, to the terminal in a first HARQ feedback window, When the terminal successfully receives the transmission block 1 and the transmission block 2, the first indication information correspondingly indicated by the transmission block 2 indicates that one transmission block still remains to be received. However, the transmission block 3 is lost in the transmission process, and the terminal may know that the transmission block 3 is lost according to the first indication information, by determining that only 2 transmission blocks are received in the first HARQ feedback window, that is, only the transmission block 1 and the transmission block 2 are received. The terminal feeds those receiving and losing results of the downlink transmission blocks in the first HARQ feedback window back to the base station through the HARQ feedback mode, so that the base station may determine to resend the downlink transmission block 3 to the terminal.

Here, the downlink transmission blocks may refer to downlink data sent by a certain downlink shared physical channel. Here, "on the subframe after the current subframe and the subcarrier after the current subcarrier" may refer to "on the subframe after the current subframe and the subcarrier at a higher frequency after the current subcarrier". Referring to FIG. 3 again, with the transmission block 3, the transmission block 4 and the transmission block 5 corresponding to the codebook 2 in FIG. 3 as examples, if the currently received transmission block is the transmission block 3, the transmission block 4 and the transmission block 5 are the transmission blocks which remain to be received by the terminal on the subframe after the current subframe and the subcarrier at the higher frequency after the current subcarrier. Here, corresponding carrier frequencies of the transmission block 4 and the transmission block 5 are higher than a corresponding carrier frequency of the transmission block 3.

In the examples of the disclosure, the terminal can determine the quantity of the downlink transmission blocks received by the terminal on the subframe after the current subframe and the subcarrier after the current subcarrier in the current hybrid automatic repeat request (HARQ) feedback window according to the first indication information. The terminal determines whether each downlink transmission block sent by the base station is lost or not according to the quantity of the downlink transmission blocks remaining to be received, and information of the downlink transmission blocks already received by the terminal as obtaining the quantity of the downlink transmission blocks remaining to be received, so that the problem of unclear feedback contents during HARQ feedback as the quantity of the downlink transmission blocks sent by the base station is not known of the terminal is solved.

In an example, in the step S110, the downlink control information further includes second indication information. The second indication information is used for indicating that the terminal is to send HARQ feedback of first transmission blocks and/or HARQ feedback of second transmission blocks, and specifically, that the first transmission blocks are the transmission blocks decoded by a currently used first codebook, and the second transmission blocks are the transmission blocks decoded by a second codebook used before the first codebook.

Herein, the codebooks correspond to the HARQ feedback windows. For example, in a second HARQ feedback window, the second transmission blocks include a transmission block 1, a transmission block 2 and a transmission block 3. Here, the second HARQ feedback window corresponds to the second codebook, and the transmission block 1, the transmission block 2 and the transmission block 3 are decoded by the second codebook. In the first HARQ feedback window, the first transmission blocks include a transmission block 3, a transmission block 4 and a transmission block 5. Here, the first HARQ feedback window corresponds to the first codebook, and the transmission block 3, the transmission block 4 and the transmission block 5 are decoded by the first codebook.

If HARQ feedback, corresponding to the transmission block 1, the transmission block 2 and the transmission block 3 included in the second transmission blocks, is AAN (AAN is used for characterizing that HARQ feedback contents, corresponding to the transmission block 1, the transmission block 2 and the transmission block 3, are ACK, ACK and NACK respectively here, that is the transmission block 1 and the transmission block 2 are successfully received, and the transmission block 3 is lost), and if HARQ feedback, corresponding to the transmission block 3, the transmission block 4 and the transmission block 5 included in the first transmission blocks, is AAA (AAA is used for characterizing that HARQ feedback contents, corresponding to the transmission block 1, the transmission block 2 and the transmission block 3, are ACK, ACK and ACK respectively here, that is the transmission block 1, the transmission block 2 and the transmission block 3 are all successfully received), when the second indication information indicates that the terminal is to send HARQ feedback of the first transmission blocks and HARQ feedback of the second transmission blocks, the corresponding HARQ feedback content is AANAAA.

Here, when the second indication information indicates that the terminal is to send HARQ feedback of the first transmission blocks, the corresponding HARQ feedback content is AAA. Here, there may be a plurality of second transmission blocks, for example, if the first transmission block is the Nth transmission block, the second transmission blocks may be the $(N-1)^t$ transmission block, the $(N-2)^t$ transmission block, the $(N-3)^{th}$ transmission block and the like and may further be a plurality of transmission blocks among the $(N-1)^t$ transmission block, the $(N-2)^t$ transmission block, the $(N-3)^{th}$ transmission block and the like, such as the $(N-1)^{th}$ transmission block and the $(N-2)^{th}$ transmission block. In this example, transmission resources are conserved because a plurality of transmission blocks conduct HARQ feedback together.

In an example, the second indication information is used for indicating the terminal is to send HARQ feedback of the first transmission blocks when having a first indicated value; and the second indication information is used for indicating the terminal is to send HARQ feedback of the first transmission blocks and HARQ feedback of the second transmission blocks when having a second indicated value.

Here, the first indicated value may be a value corresponding to a certain field in the second indication information, for example, if the second indication information includes a field XXX01XX, 01 in the field is the first indicated value to be used for determining to send HARQ feedback of the first transmission blocks. As another example, if the second indication information includes a field XXX10XX, 10 in the field is the first indicated value to be used for determining to send HARQ feedback of the first transmission blocks and HARQ feedback of the second transmission blocks. Here, sending HARQ feedback of the first transmission blocks may refer to only conducting HARQ feedback on the receiving condition of the transmission blocks in the current HARQ feedback window. Sending HARQ feedback of the first transmission blocks and HARQ feedback of the second transmission blocks may refer to conducting HARQ feedback on a receiving result of the transmission blocks in other HARQ feedback windows and a receiving result of the transmission blocks in the current HARQ feedback window together.

In an example, if HARQ feedback, received in advance of the second transmission blocks is successfully received, the second indication information has the first indicated value, and the first indicated value is used for indicating the terminal to send HARQ feedback of the first transmission blocks; and if HARQ feedback, received in advance of the second transmission blocks fails to be received, the second indication information has the second indicated value, and the second indicated value is used for indicating the terminal is to send HARQ feedback of the first transmission blocks and HARQ feedback of the second transmission blocks.

Here, HARQ feedback, received in advance of the second transmission blocks may be HARQ feedback received in one or more HARQ feedback windows before the current HARQ feedback window, of the second transmission blocks, for example, HARQ feedback, received in the $(N-1)^{th}$ HARQ feedback window or the $(N-1)^{th}$ HARQ feedback window, the $(N-2)^{th}$ HARQ feedback window and the $(N-3)^{th}$ HARQ feedback window, of the second transmission blocks. Here, the circumstance that HARQ feedback of the second transmission blocks is successfully received may refer to the circumstance that the base station receives HARQ feedback in a first period after sending the second transmission blocks. That HARQ feedback of the second transmission blocks fails to be received, may refer to a circumstance in which the base station does not receive HARQ feedback in a first period after sending the second transmission blocks. Here, if HARQ feedback, received in advance of the second transmission blocks is successfully received, the first indicated value of the second indication information may be set as 01, and the first indicated value is used for indicating the terminal is to send HARQ feedback of the first transmission blocks; and if HARQ feedback, received in advance of the second transmission blocks fails to be received, the first indicated value of the second indication information may be set as 10, and the second indicated value is used for indicating the terminal is to send HARQ feedback of the first transmission blocks and HARQ feedback of the second transmission blocks.

In an example, the numerical information determined by the bit number occupied by the second indication information is used for indicating the terminal is to determine the quantity of the second transmission blocks conducting HARQ feedback when HARQ feedback of the first transmission blocks and HARQ feedback of the second transmission blocks are sent.

Here, with 2 bits occupied by the second indication information as an example, if numerical values which can be characterized by the 2 bits are 01, 10 and 11 respectively, the numerical value may be set as 01, and the quantity of the second transmission blocks conducting HARQ feedback is determined to be 0 correspondingly, that is, only HARQ feedback of the first transmission blocks is sent during HARQ feedback. If the numerical value is set as 10, the quantity of the second transmission blocks conducting HARQ feedback is determined to be 1 correspondingly, that is, HARQ feedback of the first transmission blocks and HARQ feedback of one transmission block before the first transmission blocks may be sent during HARQ feedback. If the numerical value is set as 11, the quantity of the second transmission blocks conducting HARQ feedback is determined to be 2 correspondingly, that is, HARQ feedback of the first transmission blocks and two continuous transmission blocks before the first transmission blocks are sent during HARQ feedback. Here, it should be noted that the second indication information may occupy any set quantity of bits to be used for characterizing HARQ feedback of the first transmission blocks and a plurality of continuous transmission blocks before the first transmission blocks during HARQ feedback, for example, 3 bits, 4 bits and the like.

In an example, the downlink control information includes third indication information. The method further includes: the third indication information is set in a counting mode between the HARQ feedback windows, and specifically, if HARQ feedback, received in advance of the second transmission blocks fails to be received, the counting mode between the HARQ feedback windows is a continuous counting mode, and the third indication information is used for indicating the quantity of the downlink transmission blocks received by the terminal on the current subframe, the subframe before the current subframe, the current subcarrier and a subcarrier before the current subcarrier in each HARQ feedback window.

Here, the third indication information may be used for indicating how much downlink data may be received by the terminal on the subframes till the current subframe and the subcarriers till the current subcarrier in the current HARQ feedback window. Here, "on the current subframe, the subframe before the current subframe, the current subcarrier and the subcarrier before the current subcarrier" may refer to "on the current subframe, the subframe before the current subframe, the current subcarrier and the subcarrier at a lower frequency before the current subcarrier". Here, the terminal can determine the quantity of the downlink transmission blocks which can be received on the current subframe, the subframe before the current subframe, the current subcarrier and the subcarrier before the current subcarrier in each HARQ feedback window based on the third indication information, so as to further determine the receiving condition of the transmission blocks. For example, in the current HARQ feedback window, if a field set value contained in corresponding the third indication information of the fourth transmission block 4 is set as 4, the terminal knows that totally 3 transmission blocks are sent before the fourth transmission block in the current HARQ feedback window after receiving the third indication information.

Here, if HARQ feedback, received in advance of the second transmission blocks fails to be received, the counting mode between the HARQ feedback windows is the continuous counting mode, so that the terminal can conveniently determine the transmission condition of the second transmission blocks when the first transmission blocks and the second transmission blocks conduct feedback together. For example, the first transmission blocks correspond to the current HARQ feedback window, and the second transmission blocks correspond to the HARQ feedback window before the current HARQ feedback window; and when the HARQ feedback of the second transmission blocks fails to be received, continuous counting is conducted between the two HARQ feedback windows, and in so doing, the quantity of the downlink transmission blocks which should be fed back currently may be determined.

Figure 9:
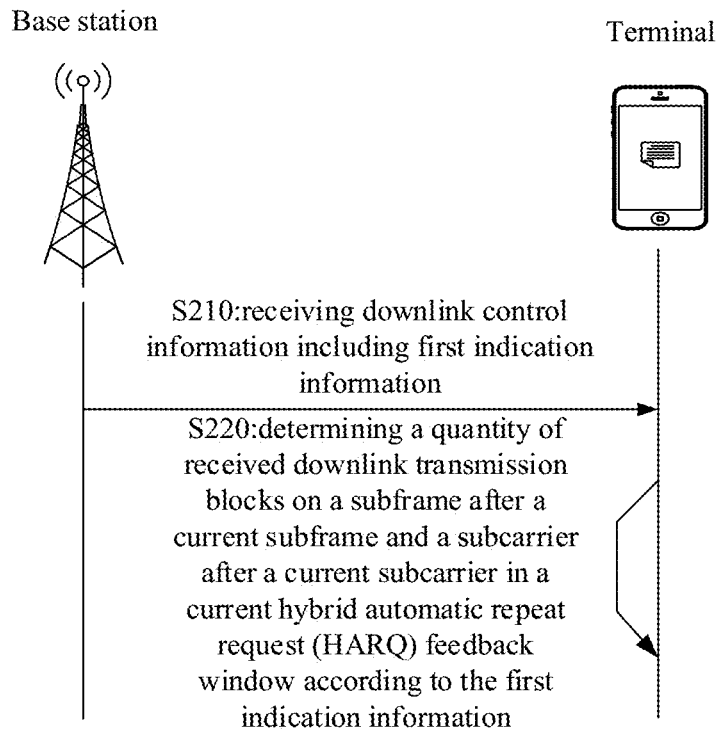
FIG. 9 is a schematic diagram of an HARQ feedback implementation provided according to another example of the disclosure.

As shown in FIG. 9, another example of the disclosure provides an HARQ feedback enhancement method including: step S210: receiving the downlink control information including the first indication information; step S220: determining the quantity of the received downlink transmission blocks on the subframe after the current subframe and the subcarrier after the current subcarrier in the current hybrid automatic repeat request (HARQ) feedback window according to the first indication information.

Here, when data transmission is conducted based on hybrid automatic repeat request (HARQ) feedback of the transmission blocks, a data receiving terminal determines whether it correctly receives data or not. If the data is correctly received, ACK is fed back; and if the data is not correctly received, NACK is fed back. Here, ACK/NACK is transmitted on a physical uplink control channel (PUCCH) or a physical uplink shared channel (PUSCH). Here, in a time division duplex system, a downlink shared physical channel sending a plurality of downlink subframes, may feed back ACK or NACK through one uplink subframe. All the downlink subframes, corresponding to one uplink subframe form a set K, and all the downlink subframes in the set K are collectively called one HARQ feedback window. The terminal may determine whether each downlink transmission block sent by the base station is lost or not according the quantity of the downlink transmission blocks remaining to be received and information of the downlink transmission blocks which have been received by the terminal already.

For example, the base station has sent 6 transmission blocks which are a transmission block 1, a transmission block 2, a transmission block 3, a transmission block 4, a transmission block 5 and a transmission block 6 respectively. Field values contained in the corresponding first indication information are 5, 4, 3, 2, 1 and 0 respectively. If the transmission block 2 and the transmission block 5 are lost in the transmission process, the terminal determines loss of the transmission block 2 and the transmission block 5 according to information of the transmission block 1, the transmission block 3, the transmission block 4 and the transmission block 6 already received by the terminal in sequence in combination with the field values corresponding to the corresponding first indication information of the transmission block 1, the transmission block 3, the transmission block 4 and the transmission block 6, and feeds receiving and losing results of the downlink transmission blocks back to the base station through an HARQ feedback mode, so that the base station may determine whether to resend the downlink transmission blocks to the terminal or to send new downlink transmission blocks to the terminal.

For example, the base station sends 3 downlink transmission blocks, which are the transmission block 1, the transmission block 2 and the transmission block 3 respectively, to the terminal in a first HARQ feedback window, When the terminal successfully receives the transmission block 1 and the transmission block 2, the first indication information correspondingly indicated by the transmission block 2 indicates that one transmission block remains to be received. However, the transmission block 3 is lost in the transmission process, and the terminal may know that the transmission block 3 is lost according to the first indication information when determining that only 2 transmission blocks are received in the first HARQ feedback window, that is, only receiving the transmission block 1 and the transmission block 2, and feeds receiving and losing results of the downlink transmission blocks in the first HARQ feedback window back to the base station through the HARQ feedback mode, so that the base station may determine to resend the downlink transmission block 3 to the terminal.

Here, the downlink transmission blocks may refer to downlink data sent by a certain downlink shared physical channel. Here, "on the subframe after the current subframe and the subcarrier after the current subcarrier" may refer to "on the subframe after the current subframe and the subcarrier at a higher frequency after the current subcarrier". Referring to FIG. 3 again, with the transmission block 3, the transmission block 4 and the transmission block 5 corresponding to the codebook 2 in FIG. 3 as examples, if the currently received transmission block is the transmission block 3, then the transmission block 4 and the transmission block 5 are the transmission blocks which are remain to be received by the terminal on the subframe after the current subframe and the subcarrier at a higher frequency after the current subcarrier. Here, corresponding carrier frequencies of the transmission block 4 and the transmission block 5 are larger than a corresponding carrier frequency of the transmission block 3.

In the examples of the disclosure, the terminal can determine the quantity of the downlink transmission blocks received by the terminal on the subframe after the current subframe and the subcarrier after the current subcarrier in the current hybrid automatic repeat request (HARQ) feedback window according to the first indication information. The terminal determines whether each downlink transmission block sent by the base station is lost or not according to the quantity of the downlink transmission blocks remaining to be received and information of the downlink transmission blocks already received by the terminal as obtaining the quantity of the downlink transmission blocks remaining to be received, so that the problem of unclear feedback contents during HARQ feedback as the quantity of the downlink transmission blocks sent by the base station is not known of the terminal is solved.

In an example, the downlink control information further includes the second indication information. In the step S210, according to the second indication information, HARQ feedback of first transmission blocks and/or HARQ feedback of second transmission blocks are sent, and specifically, the first transmission blocks are the transmission blocks decoded by the currently used first codebook, and the second transmission blocks are the transmission blocks decoded by the second codebook used before the first codebook.

Herein, the codebooks correspond to the HARQ feedback windows. For example, in a second HARQ feedback window, the second transmission blocks include a transmission block 1, a transmission block 2 and a transmission block 3. Here, the second HARQ feedback window corresponds to the second codebook, and the transmission block 1, the transmission block 2 and the transmission block 3 are decoded by the second codebook. In the first HARQ feedback window, the first transmission blocks include a transmission block 3, a transmission block 4 and a transmission block 5. Here, the first HARQ feedback window corresponds to the first codebook, and the transmission block 3, the transmission block 4 and the transmission block 5 are decoded by the first codebook.

If HARQ feedback, corresponding to the transmission block 1, the transmission block 2 and the transmission block 3 included in the second transmission blocks, is AAN (AAN is used for characterizing that HARQ feedback contents, corresponding to the transmission block 1, the transmission block 2 and the transmission block 3, are ACK, ACK and NACK respectively here, that is the transmission block 1 and the transmission block 2 are successfully sent, and the transmission block 3 is lost), and if HARQ feedback corresponding to the transmission block 3, the transmission block 4 and the transmission block 5 included in the first transmission blocks is AAA (AAA is used for characterizing that HARQ feedback contents, corresponding to the transmission block 1, the transmission block 2 and the transmission block 3, are ACK, ACK and ACK respectively here, that is the transmission block 1, the transmission block 2 and the transmission block 3 are all successfully sent), when the second indication information indicates the terminal to send HARQ feedback of the first transmission blocks and HARQ feedback of the second transmission blocks, the corresponding HARQ feedback content is AANAAA.

Here, when the second indication information indicates the terminal is to send HARQ feedback of the first transmission blocks, the corresponding HARQ feedback content is AAA. Here, there may be a plurality of second transmission blocks, for example, if the first transmission block is the Nth transmission block, the second transmission blocks may be the $(N-1)^t$ transmission block, the $(N-2)^t$ transmission block, the $(N-3)^{th}$ transmission block and the like and may further be a plurality of second transmission blocks among the $(N-1)^{th}$ transmission block, the $(N-2)^{th}$ transmission block, the $(N-3)^t$ transmission block and the like, such as the $(N-1)^t$ transmission block and the $(N-2)^t$ transmission block. In the example, transmission resources can be saved in that a plurality of transmission blocks conduct HARQ feedback together.

Here, when the second indication information has the first indicated value, the terminal sends HARQ feedback of the first transmission blocks; and when the second indication information has the second indicated value, the terminal sends HARQ feedback of the first transmission blocks and HARQ feedback of the second transmission blocks.

Here, the first indicated value may be a value corresponding to a certain field in the second indication information. For example, if the second indication information includes a field XXX01XX, 01 in the field is the first indicated value to be used for determining to send HARQ feedback of the first transmission blocks. As another example, if the second indication information includes a field XXXI0XX, 10 in the field is the first indicated value to be used for determining to send HARQ feedback of the first transmission blocks and HARQ feedback of the second transmission blocks. Here, sending HARQ feedback of the first transmission blocks may refer to only conducting HARQ feedback on the receiving condition of the transmission blocks in the current HARQ feedback window. Sending HARQ feedback of the first transmission blocks and HARQ feedback of the second transmission blocks may refer to conducting HARQ feedback on a receiving result of the transmission blocks in other HARQ feedback windows and a receiving result of the transmission blocks in the current HARQ feedback window together.

In an example, according to the numerical information determined by the bit number occupied by the second indication information, the quantity of the second transmission blocks conducting HARQ feedback is determined when HARQ feedback of the first transmission blocks and HARQ feedback of the second transmission blocks are sent. Here, with 2 bits occupied by the second indication information as an example, assuming numerical values characterized by the 2 bits may be 01, 10 and 11 respectively, the numerical value may be set as 01, and the quantity of the second transmission blocks conducting HARQ feedback is determined to be 0 correspondingly, that is, only HARQ feedback of the first transmission blocks is sent during HARQ feedback. If the numerical value is set as 10, the quantity of the second transmission blocks conducting HARQ feedback is determined to be 1 correspondingly, that is, HARQ feedback of the first transmission blocks and HARQ feedback of one transmission block before the first transmission blocks may be sent during HARQ feedback. And, if the numerical value is set as 11, the quantity of the second transmission blocks conducting HARQ feedback is determined to be 2 correspondingly, that is, HARQ feedback of the first transmission blocks and two continuous transmission blocks before the first transmission blocks are sent during HARQ feedback. Here, it should be noted that the second indication information may occupy any set quantity of bits to be used for characterizing HARQ feedback of the first transmission blocks and a plurality of continuous transmission blocks before the first transmission blocks during HARQ feedback, for example, 2 bits, 3 bits and the like.

In an example, the downlink control information further includes the third indication information. The method further includes: when the second indication information makes an indication of sending HARQ feedback of the first transmission blocks and HARQ feedback of the second transmission blocks, the third indication information is determined to be in the continuous counting mode between the HARQ feedback windows, and specifically, the third indication information is used for indicating the quantity of the downlink transmission blocks received by the terminal on the current subframe, the subframe before the current subframe, the current subcarrier and the subcarrier before the current subcarrier in continuous HARQ feedback windows; and feedback contents of HARQ feedback are determined according to the first indication information and the third indication information.

Here, "on the current subframe, the subframe before the current subframe, the current subcarrier and the subcarrier before the current subcarrier" may refer to "on the current subframe, the subframe before the current subframe, the current subcarrier and the subcarrier at a lower frequency before the current subcarrier". Here, the terminal can determine the quantity of the downlink transmission blocks which can be received on the current subframe, the subframe before the current subframe, the current subcarrier and the subcarrier before the current subcarrier in each HARQ feedback window based on the third indication information so as to further determine the receiving condition of the transmission blocks. For example, in the current HARQ feedback window, if a field value contained in corresponding the third indication information of the fourth transmission block 4 is set as 4, the terminal may know that totally 3 transmission blocks are sent before the fourth transmission block in the current HARQ feedback window after receiving the third indication information.

Here, when the second indication information makes an indication of sending HARQ feedback of the first transmission blocks and HARQ feedback of the second transmission blocks, the counting mode between the HARQ feedback windows is the continuous counting mode, so that the terminal can conveniently determine the transmission condition of the second transmission blocks when the first transmission blocks and the second transmission blocks conduct feedback together. For example, the first transmission blocks correspond to the current HARQ feedback window, and the second transmission blocks correspond to the HARQ feedback window before the current HARQ feedback window; and when the HARQ feedback of the second transmission blocks fails, and the second indication information makes an indication of sending HARQ feedback of the first transmission blocks and HARQ feedback of the second transmission blocks, continuous counting is conducted between the two HARQ feedback windows, and then the quantity of the downlink transmission blocks which should be fed back currently may be determined.

Here, the feedback contents of HARQ feedback are determined according to the first indication information and the third indication information. For example, a field value contained in the third indication information is 6, that is the base station sends 6 transmission blocks which are the transmission block 1, the transmission block 2, the transmission block 3, the transmission block 4, the transmission block 5 and the transmission block 6 respectively. If field values contained in the corresponding first indication information are 5, 4, 3, 2, 1 and 0 respectively, and the transmission block 2 and the transmission block 5 are lost in the transmission process, the terminal determines loss of the transmission block 2 and the transmission block 5 according to information of the transmission block 1, the transmission block 3, the transmission block 4 and the transmission block 6 already received by the terminal in sequence in combination with the field values corresponding to the corresponding first indication information and the field values corresponding to the corresponding third indication information of the transmission block 1, the transmission block 3, the transmission block 4 and the transmission block 6 and feeds receiving and losing results of the downlink transmission blocks back to the base station through the HARQ feedback mode.

Further, the disclosure further provides a specific example to further describe the HARQ feedback enhancement method according to the examples of the disclosure.

EMBODIMENT 1

Figure 10:
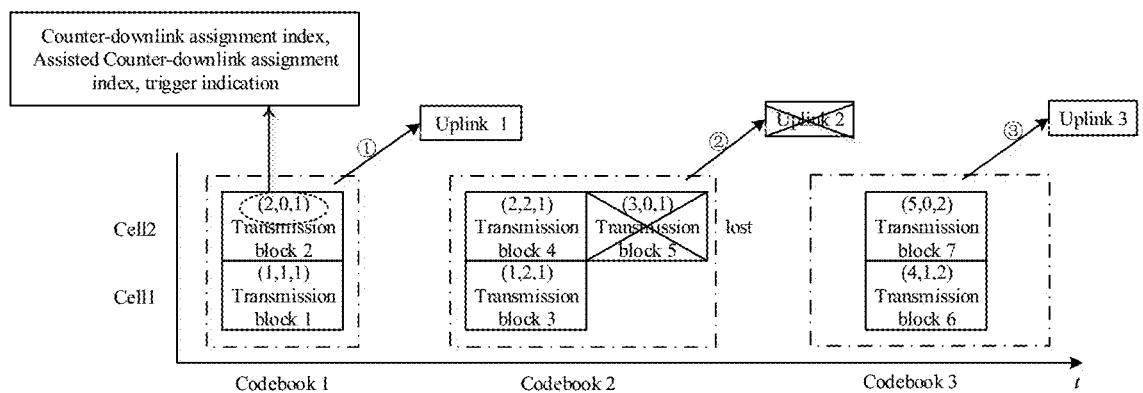
FIG. 10 is a schematic diagram of an HARQ feedback scheme according to an example of the disclosure.

Referring to FIG. 10, as a part of downlink transmission blocks of a codebook 2 are lost (the transmission block 5 is lost), and HARQ feedback fails (corresponding to ② in FIG. 10), a base station sets a trigger indication (TI) of second indication information of a codebook 3 as 2, and a terminal is triggered to feed back the data receiving condition of the codebook 2 together with the codebook 3; and the terminal knows that HARQ feedback of the codebook 2 fails according to TI=2, and transmits HARQ feedback of the codebook 2 and the codebook 3 together in a feedback resource indicated by the codebook 3 when receiving the codebook 3 sent by the base station, and may judge that HARQ feedback contents corresponding to the codebook 2 and the codebook 3 are AANAA according to indications of C-DAI and AC-DAI. Here, the AC-DAI may used for indicating how much downlink data remains to be received on subsequent subframes from the current subframe and all subsequent subcarriers from the current subcarrier in the current HARQ feedback window, and a user judges corresponding A or N of subsequent downlink data according to the receiving condition.

Figure 11A:
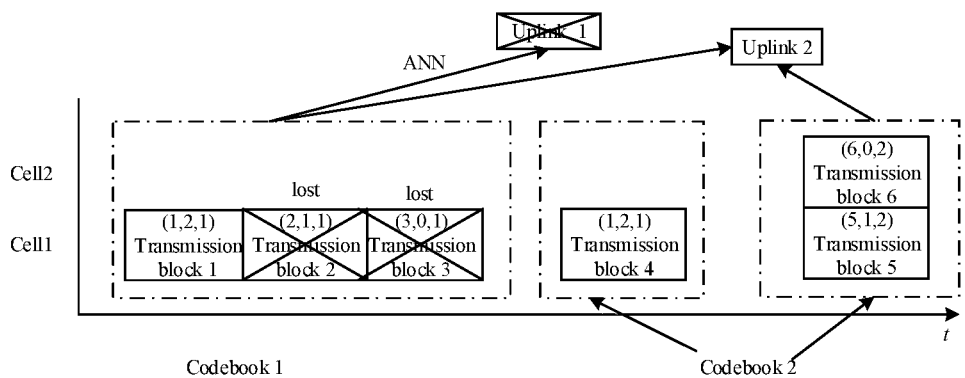
FIG. 11a is a schematic diagram of an HARQ feedback scheme according to yet another example of the disclosure.
Figure 11B:
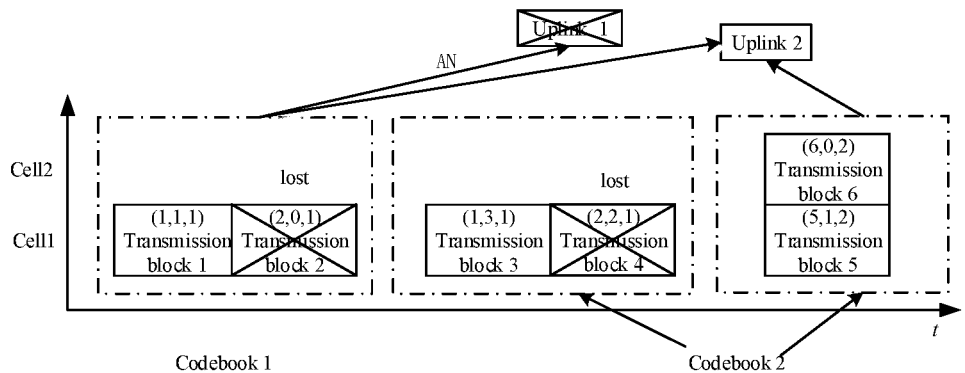
FIG. 11b is a schematic diagram of an HARQ feedback scheme according to yet another example of the disclosure.
Figure 11C:
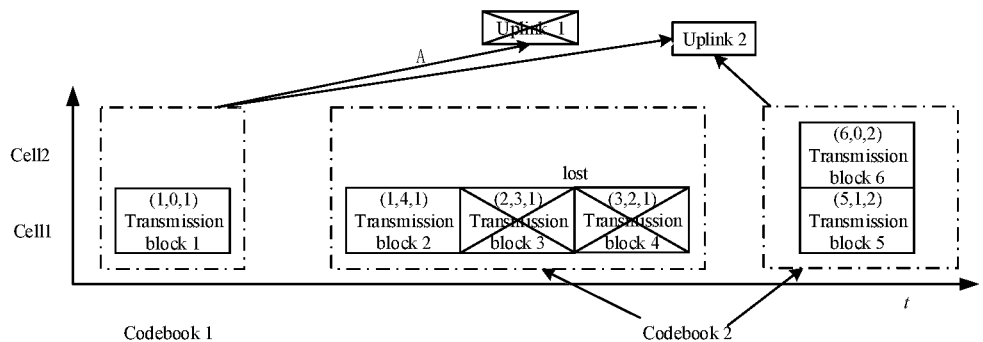
FIG. 11c is a schematic diagram of an HARQ feedback scheme according to yet another example of the disclosure.

The embodiment may reduce the problem of unclear HARQ feedback between the base station and the terminal in a scheme that previous HARQ codebook retransmission is triggered in the middle of the current HARQ codebook. Referring to FIG. 11*a*, FIG. 11*b* and FIG. 11*c*, due to failure of UL 1 feedback, the base station sets the TI of the codebook 2 as 2 to trigger the user to feed the data receiving condition of the codebook 1 back together with the codebook 2. Although the solution triggers a same retransmission indication in three schemes corresponding to FIG. 11*a*, FIG. 11*b* and FIG. 11*c*, there will not be an error as the terminal has different understandings to distinguish various codebooks.

For example, in FIG. 11*a*, the terminal judges that there are still two downlink transmission blocks to be received for the current codebook according to an indication of AC-DAI, when receiving the downlink transmission block 1 of the codebook 1; the terminal judges that the HARQ feedback content required to be fed back by the codebook 1 is ANN if receiving fails. When the base station starts to send the downlink transmission block 4 of the codebook 2, HARQ feedback is not triggered at this moment as failure in feedback of the codebook 1 is not detected yet; and the user knows there are still two downlink transmission blocks required to be received subsequently according to the indication of AC-DAI in the downlink transmission block 4, the base station sets the trigger indications TI in the downlink transmission block 5 and the downlink transmission block 6 as 2 to trigger the user to feed the codebook 1 and the codebook 2 back together when detecting failure in HARQ feedback of the codebook 1, and the terminal judges that the HARQ content corresponding to the codebook 2 is AAA according to the receiving condition of the downlink transmission blocks in the codebook 2 and feeds the HARQ feedback contents of the codebook 1 and the codebook 2 back to the base station on the UL 2.

Similarly, in FIG. 11*b* and FIG. 11*c*, the terminal feeds ANANAA and AANNAA back to the base station on the UL 2 without the situation that the terminal feeds HARQ back wrongly, so that the problem of the unclear HARQ feedback codebook between the base station and the user is reduced.

An example of the disclosure provides an HARQ feedback enhancement apparatus, including a sending module. The sending module is configured to send the downlink control information including the first indication information to the terminal, in which the first indication information is used for indicating the quantity of the downlink transmission blocks received by the terminal on the subframe after the current subframe and the subcarrier after the current subcarrier in the current hybrid automatic repeat request (HARQ) feedback window.

In an example, the sending module is further configured such that the downlink control information further includes the second indication information. The second indication information is used for indicating the terminal is to send HARQ feedback of the first transmission blocks and/or HARQ feedback of the second transmission blocks, and specifically, the first transmission blocks are the transmission blocks decoded by the currently used first codebook, and the second transmission blocks are the transmission blocks decoded by the second codebook used before the first codebook.

In an example, the sending module is further configured such that, if HARQ feedback received in advance of the second transmission blocks is successfully received, the second indication information has the first indicated value, and the first indicated value is used for indicating the terminal to send HARQ feedback of the first transmission blocks; and if HARQ feedback received in advance of the second transmission blocks fails to be received, the second indication information has the second indicated value, and the second indicated value is used for indicating the terminal to send HARQ feedback of the first transmission blocks and HARQ feedback of the second transmission blocks.

In an example, the sending module is further configured such that the numerical information determined by the bit number occupied by the second indication information is used for indicating the terminal is to determine the quantity of the second transmission blocks conducting HARQ feedback when HARQ feedback of the first transmission blocks and HARQ feedback of the second transmission blocks are sent.

In an example, the downlink control information includes the third indication information. The sending module is further configured such that: the third indication information is set in the counting mode between the HARQ feedback windows, and specifically, if HARQ feedback, received in advance, of the second transmission blocks fails to be received, the counting mode between the HARQ feedback windows is the continuous counting mode, and the third indication information is used for indicating the quantity of the downlink transmission blocks received by the terminal on the current subframe, the subframe before the current subframe, the current subcarrier and a subcarrier before the current subcarrier in each HARQ feedback window.

Another example of the disclosure provides an HARQ feedback enhancement apparatus, including a receiving module. The receiving module is configured to receive the downlink control information including the first indication information, and determine the quantity of the downlink transmission blocks received on the subframe after the current subframe and the subcarrier after the current subcarrier in the current hybrid automatic repeat request (HARQ) feedback window according to the first indication information.

In an example, the downlink control information further includes the second indication information. The receiving module is further configured to send HARQ feedback of the first transmission blocks and/or HARQ feedback of the second transmission blocks according to the second indication information, and specifically, the first transmission blocks are the transmission blocks decoded by the currently used first codebook, and the second transmission blocks are the transmission blocks decoded by the second codebook used before the first codebook.

In an example, the receiving module is further configured to determine the quantity of the second transmission blocks conducting HARQ feedback according to the numerical information determined by the bit number occupied by the second indication information when HARQ feedback of the first transmission blocks and HARQ feedback of the second transmission blocks are sent.

In an example, the downlink control information further includes the third indication information. The receiving module is further configured to determine the third indication information to be in the continuous counting mode between the HARQ feedback windows when the second indication information indicates to send HARQ feedback of the first transmission blocks and HARQ feedback of the second transmission blocks, and specifically, the third indication information is used for indicating the quantity of the downlink transmission blocks received by the terminal on the current subframe, the subframe before the current subframe, the current subcarrier and the subcarrier before the current subcarrier in the continuous HARQ feedback windows; and the receiving module is further configured to determine the feedback contents of HARQ feedback according to the first indication information and the third indication information.

An example of the disclosure further provides a communication device, including: an antenna; a memory; and a processor, connected with the antenna and the memory separately, used for controlling the antenna to receive and send a wireless signal by executing an executable program stored in the memory thereby executing the steps of a determination method of contention windows provided by any example mentioned above.

The communication device provided by the example may be the terminal or the base station mentioned above. The terminal may be various human carrying terminals or vehicle-mounted terminals. The base station may be various types of base stations, for example, a 4G base station, a 5G base station or other types of base stations.

The antenna may be various types of antennas, for example, a 3G antenna, a 4G antenna, a 5G antenna or other mobile antennas and may further include a WiFi antenna, a wireless charging antenna or the like.

The memory may include various types of memory media. The storage medium is a non-transitory computer storage medium and may continuously store information stored therein after the communication device is powered off.

The processor may be connected with the antenna and the memory through a bus and the like respectively and is used for reading the executable program stored in the memory, for example, at least one of the methods as shown in FIG. 8 and FIG. 9.

An example of the disclosure further provides a non-transitory computer-readable storage medium. The non-transitory computer-readable storage medium stores the executable program, in which, when the executable program is executed by the processor, the steps of the determination method of the contention windows provided by any example mentioned above are implemented, for example, at least one of the methods as shown in FIG. 8 and FIG. 9.

Figure 12:
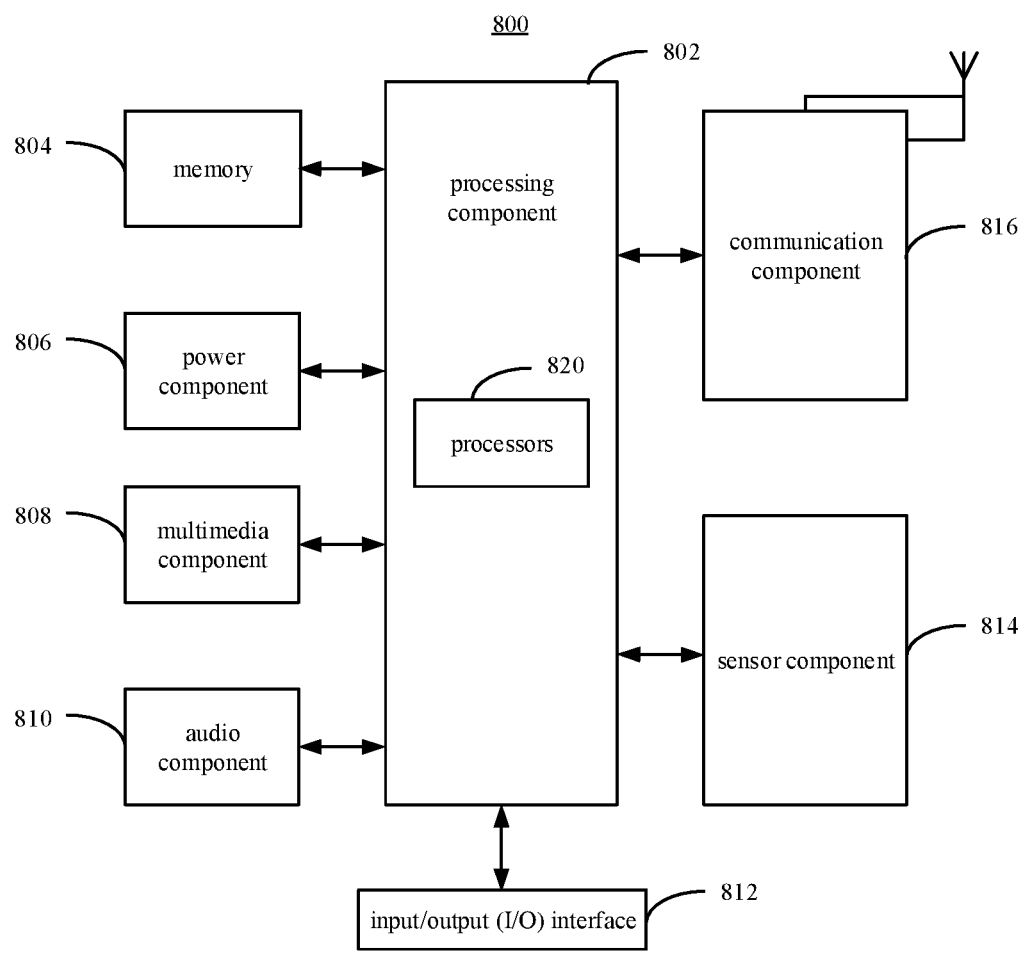
FIG. 12 is a structural schematic diagram of a terminal according to an example of the disclosure.

As shown in FIG. 14, an example of the disclosure provides a structure of a terminal. Referring to terminal 800 as shown in FIG. 12, the example provides the terminal 800. The terminal 800 may specifically be a mobile telephone, a computer, a digital broadcast terminal, a message receiving and transmitting device, a game console, a tablet device, a medical device, a body building device, a personal digital assistant and the like.

Referring to FIG. 12, the terminal 800 may include one or more of the following structures: a processing component 802, a memory 804, a power component 806, a multimedia component 808, an audio component 810, an input/output (I/O) interface 812, a sensor component 814 and a communication component 816.

The processing component 802 generally controls a whole operation of the terminal 800, for example, operations associated with a display operation, a telephone calling operation, a data communication operation, a camera operation and a recording operation. The processing component 802 may include one or more processors 820 to execute instructions to carry out the whole or a part of the steps of the method. In addition, the processing component 802 may include one or more modules to facilitate interaction between the processing component 802 and other assemblies. For example, the processing component 802 may include a multimedia module to facilitate interaction between the multimedia component 808 and the processing component 802.

The memory 804 is configured to store various types of data to support operations on the device 800. The embodiments of the data include an instruction, contact data, telephone directory data, a message, an image, a video and the like of any application program or method used for being operated on the terminal 800. The memory 804 may be any types of volatile or non-volatile storage devices or a combination thereof, such as a static random access memory (SRAM), an electrically-erasable programmable read-only memory (EEPROM), an erasable programmable read-only memory (EPROM), a programmable read-only memory (PROM), a read-only memory (ROM), a magnetic memory, a flash memory, a magnetic disk or a compact disk.

The power component 806 supplies power to various assemblies of the terminal 800. The power component 806 may include a power supply management system, one or more power supplies and other assemblies for generating, managing and allocating power for the terminal 800.

The multimedia component 808 includes a screen capable of providing an output interface between the terminal 800 and a user. In some examples, the screen may include a liquid crystal display (LCD) and a touch panel (TP). The screen may be realized as a touch screen to receive an input signal from the user if including the touch panel. The touch panel includes one or more touch sensors to sense touching, sliding and gestures on the touch panel. The touch sensor may sense a border of a touching or sliding movement and further detect a duration and pressure related to a touching or sliding operation. In some embodiments, the multimedia component 808 includes a front camera and/or a rear camera. When the device 800 is in an operating mode, for example, a photographing mode or a video mode, the front camera and/or the rear camera may receive external multimedia data. Each of the front camera and the rear camera may be a fixed optical lens system or has a focal length and the optical zoom capability.

The audio component 810 is configured to output and/or input an audio signal. For example, the audio component 810 includes a microphone (MIC) configured to receive an external audio signal when the terminal 800 is in an operating mode, such as a calling mode, a recording mode and a voice recognition mode. The received audio signal may be further stored in the memory 804 or transmitted via the communication component 816. In some examples, the audio component 810 further includes a loudspeaker for outputting the audio signal.

The I/O interface 812 is an interface provided between the processing component 802 and a peripheral interface module, and the peripheral interface module may be a keyboard, a click wheel, a button and the like. These buttons may include, but is not limited to, a homepage button, a volume button, an activation button and a lock button.

The sensor component 814 includes one or more sensors for supplying various aspects of state evaluations to the terminal 800. For example, the sensor component 814 may detect an on/off state of the device 800 and relative positioning of the assemblies, for example, the assemblies are a display and a small keyboard of the device 800; and the sensor component 814 may further detect a position change of the terminal 800 or one component of the terminal 800, contact or non-contact of the user and the terminal, the azimuth of the terminal 800 or acceleration/deceleration and a temperature change of the terminal 800. The sensor component 814 may include a proximity sensor configured to detect existence of an object exists nearby without any physical contact. The sensor component 814 may further include a light sensor, such as a CMOS or a CCD image sensor, for use in an imaging application. In some examples, the sensor component 814 may further include an acceleration sensor, a gyroscope sensor, a magnetic sensor, a pressure sensor or a temperature sensor.

The communication component 816 is configured to facilitate wired or wireless communication between the terminal 800 and other devices. The terminal 800 may access a communication standard based wireless network, such as Wi-Fi, 2G, 3G or a combination thereof. In one exemplary example, a communication component 816 receives a broadcasting signal or broadcast-related information from an external broadcasting management system via a broadcast channel. In one exemplary example, the communication component 816 further includes a near-field communication (NFC) module to promote short-range communication. For example, the NFC module may be realized on the basis of a radio frequency identification (RFID) technology, an infrared data association (IrDA) technology, an ultrawide band (UWB) technology, a Bluetooth (BT) technology and other technologies.

In an exemplary example, the terminal 800 may be realized by one or more application-specific integrated circuits (ASIC), a digital signal processor (DSP), a digital signal processing device (DSPD), a programmable logic device (PLD), a field-programmable gate array (FPGA), a controller, a microcontroller, a microprocessor or other electronic elements and is used for executing the above method.

In an exemplary example, further provided is a non-transitory computer readable storage medium, including an instruction, for example, a memory 804 including the instruction; and the instruction may be executed by the processor 820 of the terminal 800 to complete the method. For example, the non-transitory computer readable storage medium may be a ROM, a random access memory (RAM), a CD-ROM, a magnetic tape, a floppy disk, an optical data storage device and the like.

The terminal may be used for realizing a capability parameter processing method mentioned above, for example, the HARQ feedback enhancement methods as shown in FIG. 8 and FIG. 9.

Figure 13:
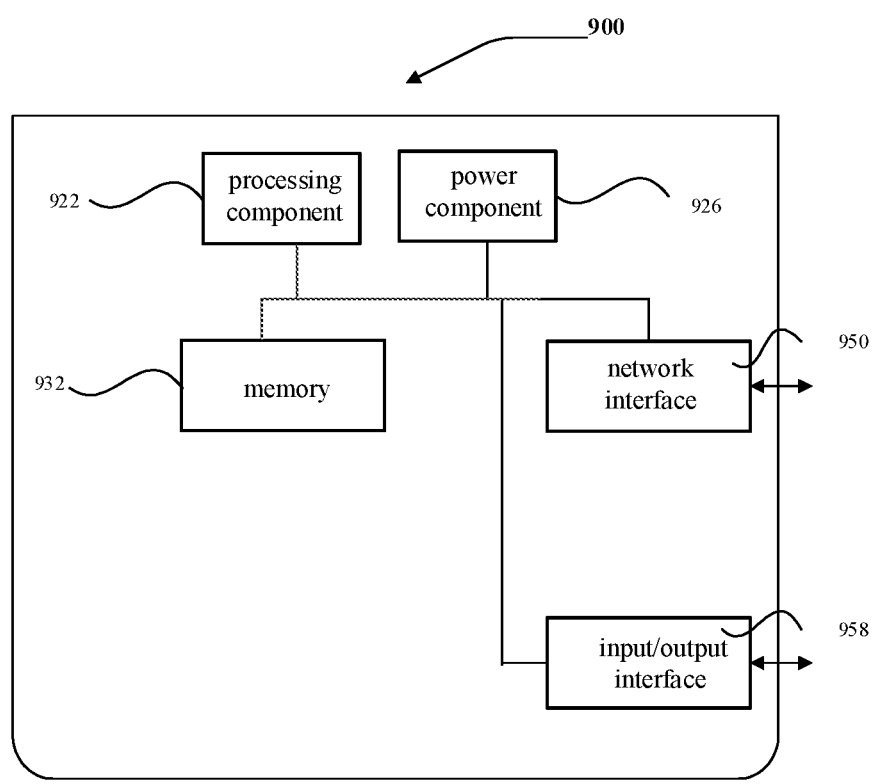
FIG. 13 is a structural schematic diagram of a base station according to an example of the disclosure.

As shown in FIG. 13, an example of the disclosure provides a structure of a base station. For example, the base station 900 may be provided as a network side device. Referring to FIG. 13, the base station 900 includes a processing component 922 and further includes one or more processors and a memory resource used for storing the instruction (such as an application program) capable of being executed by the processing component 922 and represented by the memory 932. The application program stored in the memory 932 may include each of one or more modules corresponding to a group of instructions. Moreover, the processing component 922 is configured to execute the instruction to execute a random access method provided by any foregoing example of the above methods, for example, the HARQ feedback enhancement methods as shown in FIG. 8 and FIG. 9.

The base station 900 may further include a power component 926 configured to execute power supply management of the base station 900, a wired or wireless network interface 950 configured to connect the base station 900 to a network and an input/output (I/O) interface 958. The base station 900 may operate an operating system stored in the memory 932, such as Windows Server™, Mac OS X™, Unix™, Linux™, FreeBSD™ or the like.

The wireless network interface 950 includes, but is not limited to, the antennas of the foregoing communication devices. Other implementations of the disclosure will be apparent to those skilled in the art after considering this specification or practicing the disclosed disclosure herein. The application is intended to cover any variations, uses, or adaptations of the disclosure; and these variations, uses, or adaptations follow the general principle of the application and include common general knowledges or conventional technical means undisclosed by the disclosure in the art. The specification and the examples are to be considered exemplary only, with a true scope and spirit of the application being indicated by the following claims.

It should be understood that, the application is not limited to the precision structure described above and shown in the drawings, and various alterations and modifications may be made without departing from the scope of the disclosure. The scope of the application is only limited by the appended claims.

The invention claimed is:

1. A hybrid automatic repeat request (HARQ) feedback enhancement method, comprising:
   sending downlink control information comprising first indication information to a terminal,
   wherein the first indication information is used for indicating a quantity of downlink transmission blocks received by the terminal on a subframe after a current subframe and a subcarrier after a current subcarrier in a current hybrid automatic repeat request (HARQ) feedback window;
   wherein the downlink control information further comprises second indication information, the second indication information is used for indicating the terminal to send HARQ feedback of first transmission blocks and/or HARQ feedback of second transmission blocks, the first transmission blocks are the transmission blocks decoded by a first codebook currently using, and the second transmission blocks are the transmission blocks decoded by a second codebook used before the first codebook; and
   wherein numerical information determined by a bit number occupied by the second indication information is used for indicating the terminal is to determine the quantity of the second transmission blocks conducting HARQ feedback when HARQ feedback of the first transmission blocks and HARQ feedback of the second transmission blocks are sent.

2. The HARQ feedback enhancement method according to claim 1, wherein:
   in response to determine that HARQ feedback received in advance of the second transmission blocks is successfully received, the second indication information has a first indicated value, and the first indicated value is used for indicating the terminal to send the HARQ feedback of the first transmission blocks; and
   in response to determine that HARQ feedback received in advance of the second transmission blocks fails to be received, the second indication information has a second indicated value, and the second indicated value is used for indicating the terminal to send the HARQ feedback of the first transmission blocks and the HARQ feedback of the second transmission blocks.

3. The HARQ feedback enhancement method according to claim 1, wherein the downlink control information comprises a third indication information, further comprising:
   setting the third indication information in a counting mode between HARQ feedback windows, wherein in case a response to HARQ feedback received in advance of the second transmission blocks fails to be received, the counting mode between the HARQ feedback windows is a continuous counting mode, and the third indication information is used for indicating the quantity of downlink transmission blocks received by the terminal on the current subframe, the subframe before the current subframe, the current subcarrier and a subcarrier before the current subcarrier in a HARQ feedback window.

4. A non-transitory computer-readable storage medium, which stores an executable program, wherein when the executable program is executed by the processor, the steps of the HARQ feedback enhancement method of claim 1 are implemented.

5. An HARQ feedback enhancement method, comprising:
   receiving downlink control information comprising a first indication information;
   determining the quantity of the received downlink transmission blocks on the subframe after the current subframe and the subcarrier after the current subcarrier in the current hybrid automatic repeat request (HARQ) feedback window according to the first indication information;
   wherein the downlink control information further comprises second indication information, further comprising:
   sending HARQ feedback of the first transmission blocks and/or HARQ feedback of the second transmission blocks according to the second indication information, wherein the first transmission blocks are the transmission block decoded by a first codebook currently in use, and the second transmission blocks are the transmission blocks decoded by a second codebook used before the first codebook; and
   determining the quantity of the second transmission blocks conducting HARQ feedback when HARQ feedback of the first transmission blocks and HARQ feedback of the second transmission blocks are sent, according to the numerical information determined by the bit number occupied by the second indication information.

6. The HARQ feedback enhancement method according to claim 5, wherein the downlink control information further comprises third indication information, the method further comprising:
   determining the third indication information to be in the continuous counting mode between the HARQ feedback windows, when the second indication information makes an indication of sending HARQ feedback of the first transmission blocks and HARQ feedback of the second transmission blocks,
   wherein the third indication information is used for indicating the quantity of the downlink transmission blocks received by the terminal on the current subframe, the subframe before the current subframe, the current subcarrier and the subcarrier before the current subcarrier in continuous HARQ feedback windows; and
   determining feedback contents of HARQ feedback according to the first indication information and the third indication information.

7. A communication device, comprising:
   an antenna;
   a memory; and
   a processor, connected with the antenna and the memory separately, used for controlling the antenna to receive and send a wireless signal by executing an executable program stored in the memory, and configured to implement the HARQ feedback enhancement method according to claim 5 by executing computer-executable instructions stored on the memory.

8. A non-transitory computer-readable storage medium, which stores an executable program, wherein when the executable program is executed by the processor, the steps of the HARQ feedback enhancement method of claim 5 are implemented.

9. A communication device, comprising:
an antenna;
a memory; and
a processor, connected with the antenna and the memory separately, used for controlling the antenna to receive and send a wireless signal by executing an executable program stored in the memory, and configured to:
send downlink control information comprising a first indication information to a terminal,
wherein the first indication information is used for indicating a quantity of downlink transmission blocks received by the terminal on a subframe after a current subframe and a subcarrier after a current subcarrier in a current hybrid automatic repeat request (HARQ) feedback window;
wherein the downlink control information further comprises second indication information, wherein the second indication information is used for indicating the terminal is to send HARQ feedback of first transmission blocks and/or HARQ feedback of second transmission blocks, wherein the first transmission blocks are the transmission blocks decoded by a first codebook currently in use, and the second transmission blocks are the transmission blocks decoded by a second codebook used before the first codebook; and
wherein numerical information determined by a bit number occupied by the second indication information is used for indicating the terminal to determine the quantity of the second transmission blocks conducting HARQ feedback when HARQ feedback of the first transmission blocks and HARQ feedback of the second transmission blocks are sent.

10. The communication device according to claim 9, wherein the processor is further configured to:
in response to HARQ feedback received in advance of the second transmission blocks being successfully received, the second indication information has a first indicated value, and the first indicated value is used for indicating the terminal to send the HARQ feedback of the first transmission blocks; and
in response to HARQ feedback received in advance of the second transmission blocks failing to be received, the second indication information has a second indicated value, and the second indicated value is used for indicating the terminal to send the HARQ feedback of the first transmission blocks and the HARQ feedback of the second transmission blocks.

11. The communication device according to claim 9, wherein the downlink control information comprises third indication information, and the processor is further configured to:
set the third indication information in a counting mode between HARQ feedback windows,
wherein in case a response to HARQ feedback received in advance of the second transmission blocks fails to be received, the counting mode between the HARQ feedback windows is set to a continuous counting mode, and the third indication information is used for indicating the quantity of downlink transmission blocks received by the terminal on the current subframe, the subframe before the current subframe, the current subcarrier and a subcarrier before the current subcarrier in a HARQ feedback window.

* * * * *

UNITED STATES PATENT AND TRADEMARK OFFICE
CERTIFICATE OF CORRECTION

PATENT NO. : 12,231,241 B2
APPLICATION NO. : 17/632967
DATED : February 18, 2025
INVENTOR(S) : Zhu et al.

It is certified that error appears in the above-identified patent and that said Letters Patent is hereby corrected as shown below:

On the Title Page

In Item (57), under "Abstract", in Column 2, Line 8, delete "HARO" and insert -- HARQ --, therefor.
On Page 2, in Item (56), under "OTHER PUBLICATIONS", in Column 2, Line 8, delete ""R1-1812358 "Enhancements" and insert -- R1-1812358 Enhancements --, therefor.
On Page 2, in Item (56), under "OTHER PUBLICATIONS", in Column 2, Line 9, delete "«3GPP TSG_RANIWG1_RL1»" and insert -- «3GPP TSG_RAN\WG1_RL1» --, therefor.
On Page 2, in Item (56), under "OTHER PUBLICATIONS", in Column 2, Line 13, delete ""R1-1808063 "HARQ" and insert -- R1-1808063 HARQ --, therefor.
On Page 2, in Item (56), under "OTHER PUBLICATIONS", in Column 2, Lines 15-16, delete "«3GPP TSG_RAN\WG1_RL1»(Nov." and insert -- «3GPP TSG_RAN\WG1_RL1» (Nov. --, therefor.
On Page 2, in Item (56), under "OTHER PUBLICATIONS", in Column 2, Line 23, delete "HARO-ACK" and insert -- HARQ-ACK --, therefor.

In the Specification

In Column 4, Line 18, delete "(UE, unit equipment)" and insert -- (UE, user equipment) --, therefor.
In Column 4, Line 36, delete "a mobile station, a mobile station," and insert -- a mobile station, --, therefor.
In Column 5, Line 67, delete "public data" and insert -- packet data --, therefor.
In Column 9, Line 4, delete "window, When" and insert -- window. When --, therefor.
In Column 10, Line 40, delete "(N-1)t" and insert -- $(N-1)^{th}$ --, therefor.
In Column 10, Line 40, delete "(N-2)t" and insert -- $(N-2)^{th}$ --, therefor.
In Column 10, Line 43, delete "(N-1)t" and insert -- $(N-1)^{th}$ --, therefor.
In Column 10, Line 43, delete "(N-2)t" and insert -- $(N-2)^{th}$ --, therefor.
In Column 10, Line 62, delete "XXXI0XX," and insert -- XXX10XX, --, therefor.

Signed and Sealed this
Twenty-seventh Day of January, 2026

John A. Squires
*Director of the United States Patent and Trademark Office*

In Column 13, Line 21, delete "according" and insert -- according to --, therefor.
In Column 13, Line 49, delete "window, When" and insert -- window. When --, therefor.
In Column 15, Line 16, delete "(N-1)t" and insert -- (N-1)th--, therefor.
In Column 15, Line 16, delete "(N-2)t" and insert -- (N-2)th --, therefor.
In Column 15, Line 20, delete "(N-3)t" and insert -- (N-3)th --, therefor.
In Column 15, Line 21, delete "(N-1)t" and insert -- (N-1)th--, therefor.
In Column 15, Line 21, delete "(N-2)t" and insert -- (N-2)th --, therefor.
In Column 15, Line 37, delete "XXXI0XX," and insert -- XXX10XX, --, therefor.
In Column 17, Line 28, delete "disclosure further provides" and insert -- disclosure provides --, therefor.
In Column 17, Line 48, delete "may used" and insert -- may be used --, therefor.
In Column 19, Lines 1-3, delete "HARQ feedback . . . sent." and insert the same in Column 18, at Line 67, after "conducting" as a continuation paragraph.
In Column 22, Line 10, delete "ultrawide band" and insert -- ultra-wideband --, therefor.
In Column 22, Line 65, delete "knowledges" and insert -- knowledge --, therefor.

In the Claims

In Column 23, Line 40, in Claim 2, delete "to determine" and insert -- to determining --, therefor.
In Column 23, Line 46, in Claim 2, delete "to determine" and insert -- to determining --, therefor.